United States Patent [19]

Ulrich

[11] 4,372,685
[45] Feb. 8, 1983

[54] METHOD AND ARRANGEMENT FOR THE MEASUREMENT OF ROTATIONS

[75] Inventor: Reinhard Ulrich, Leonberg, Fed. Rep. of Germany

[73] Assignee: Max-Planck-Gesellschaft zur Forderung der Wissenschaften e.V., Fed. Rep. of Germany

[21] Appl. No.: 111,853

[22] Filed: Jan. 14, 1980

[30] Foreign Application Priority Data

Jan. 15, 1979 [DE] Fed. Rep. of Germany ....... 2901388
Feb. 22, 1979 [DE] Fed. Rep. of Germany ....... 2906870

[51] Int. Cl.³ ............................................. G01B 9/02
[52] U.S. Cl. ...................................................... 356/350
[58] Field of Search ........................................ 356/350

[56] References Cited
FOREIGN PATENT DOCUMENTS

2039036 7/1980 United Kingdom ............... 356/350

*Primary Examiner*—John K. Corbin
*Assistant Examiner*—Matthew W. Koren
*Attorney, Agent, or Firm*—Antonelli, Terry & Wands

[57] ABSTRACT

In order to measure the rotation rate of a rotating light path by the Sagnac effect, a pair of phase modulated coherent light beams are passed in opposite directions along the light path. After the beams have emerged from respective ends of the light path, the intensity of one of them is detected as a measurement of the phase shift which occurs between the beams along the light path. The detected output is then passed through a synchronous rectifier to produce an error signal for a control loop for the system. In a preferred embodiment, the control loop is formed by a solenoid wound around a portion of an optical fiber located along said light path. By processing the current through the solenoid, a continuous update of a scale factor for the phase shift can be achieved. Also, interference with the phase shift in the rotating object is prevented by the structural interconnection between an input/output branching device and a beam splitter for the system utilizing the combination of a monomode wave guide and a polarizer.

20 Claims, 1 Drawing Figure

METHOD AND ARRANGEMENT FOR THE MEASUREMENT OF ROTATIONS

This invention relates to a method of measuring rotation rates by the Sagnac effect in a light path which, encircling a certain area, is running for its major part through an optical fiber and is participating in the rotation to be measured, employing two coherent light beams which are coupled with fixed states of polarization into both ends of said fiber and which are recombined after having traversed the fiber in opposite directions, said rotation rate $\Omega$ being evaluated from the intensity of one of the output light fluxes which result after recombination of said two coherent light beams, and said intensity varying as a function of the phase shift which results between said two coherent beams if the fiber marking said light path is rotated.

Theoretically, this method permits extremely accurate rotation measurements, but in practice a number of disturbing effects severely limit the attainable accuracy.

The basic method of this kind and an arrangement for realizing it have been described by Vali et al. (APPLIED OPTICS, Vol. 16 (1977) p. 290–291 and p. 2605–2607). Their arrangement does not yield an output signal varying strictly proportional to the rotation rate $\Omega$. Rather, when a simple detector is used, the output signal varies at small rotation rates proportional to $|\Omega|^2$. Therefore, a simple and accurate evaluation of the rotation rate $\Omega$ is not possible with such an arrangement. In particular, it is not possible then to determine uniquely the sense of rotation. On the other hand, arrangements may be devised for that purpose using an array of detectors to measure the spatial intensity distribution in the interference pattern, or employing a phase-quadrature beamsplitter. In those arrangements, however, thermal and mechanical instabilities affect the output signal and severely limit the accuracy of the rotation measurement. Further limitations arise from unavoidable nonlinearities in the electric system, e.g. by nonlinear amplifier and detector characteristics, and possibly also by stray light falling onto the detectors.

It is the object of the present invention, therefore, to devise a measuring method of the kind described, which avoids as far as possible the above mentioned problems of evaluation, of instabilities and of nonlinearities which limit the accuracy of the rotation measurement.

According to the present invention, this object is met by employing the following features a. to d.:

a. said two coherent light beams are subject to a phase modulation of amplitude $\Psi \sin(2\pi f_o t)$, where $\Psi$ is the maximum phase excursion and $f_o$ is the modulation frequency, and the output signal of a detector is passed through a synchronous rectifier with reference frequency $f_o$, said detector responding to said intensity of said output light flux;

b. the polarization of said two coherent light beams which travel in opposite directions are arranged to be circular on at least a section of said light path, said two circular polarizations having the same sense of rotation;

c. the current through a solenoid is controlled by an automatic control loop which uses as its error signal the filtered output signal of said synchronous rectifier and which is designed so that it is maintaining the condition $$2\Delta = 2\pi n$$

in which n is an integer and $2\Delta$ denotes the phase difference which said two coherent light beams have when they emerge again from said light path, said solenoid being wound around said fiber along at least a part of said section of said fiber, said phase difference $2\Delta$ being the algebraic sum $(2\phi + 2\phi_F)$ of a first phase shift $2\phi$ which results from the rotation of said light path and of a second phase shift $2\phi_F$ which results from the Faraday effect which is caused by the magnetic field of said solenoid in said part of the fiber;

d. said current through said solenoid represents the result of the measurement of the rotation, said current depending linearly on the rotation rate $\Omega$.

Thereby, among others, at least the following advantages result:

1. an electric signal is obtained which varies linearly with the rotation rate, and which has the particularly advantageous property of vanishing at zero rotation rate, even in the presence of stray light. This signal is generated by a phase modulation of the two light beams travelling in opposite directions along the main path of the Sagnac interferometer, and by subsequent phase-sensitive rectification of the output light flux that results at the detector by the superposition of the two light beams emerging from the ends of the fiber.

This method of generating the mentioned electric signal is distinctly different from the possibility of producing a so-called "phase bias" in the Sagnac interferometer by incorporating a Faraday cell into the light-path. One major difficulty with such a phase bias is that it must be kept absolutely constant even under conditions of varying ambient temperature, because any change in this bias cannot be distinguished from a change of the rotation rate. Therefore, phase biasing by a Faraday cell poses severe problems of stability and, hence, of accuracy. According to this invention, these problems are avoided in an elegant way by the method of phase modulation, because this method works without a phase bias.

2. The sign of the electric current in the Faraday solenoid is related uniquely to the sense of rotation.

3. The linearity of the rotation measurement according to this invention is essentially independent of the linearity of the detectors and electronic amplifiers. This advantage is obtained by employing a control circuit, containing a phase controlling element and a high-gain control amplifier, which maintains the total phase shift in the interferometer equal to zero or equal to some constant value. With that control circuit, the over-all linearity of the rotation measurement is determined by the linearity of the phase controlling element. In this element, the Faraday effect is used which shows an extremely linear dependence of the phase shift on the exciting electric current.

The basic methods described in this invention offer the advantage of permitting repeated self-calibration of the rotation measuring device. While the Faraday phase-shift is an extremely linear effect, as mentioned, the ratio of the phase shift to the exciting current depends on Verdet's constant of the fiber material is slightly temperature dependent. Therefore in self-calibrating method, such variations of Verdet's constant due to temperature changes are detected and are fully taken into account in the final result of the rotation measurement.

In accordance with one embodiment of the present invention, phase modulation is obtained by modulating current through the solenoid. This has the advantage that the phase controlling element is used simultaneously to provide the phase modulation, thus obviating the need for a separate phase modulator.

Modulating current through the solenoid or near one of the fiber ends by changing the length of a short section of the fiber has the advantage of imposing the phase modulation directly onto the light guided in the fiber, without interrupting the light propagation in any way. A separate phase modulator could instead be inserted, of course, at some point into the main light path of the interferometer. However, reflections would result at the required additional input/output couplers of that modulator and could lead to errors and instabilities in the rotation measurement.

An advantageous range of modulation is between $\frac{1}{4}T$ and $\frac{1}{2}T$, where T denotes transit time of a light signal through the light path frequencies for the phase modulation. The frequency $\frac{1}{4}T$ is particularly advantageous to keep small the undersirable contributions to the detected signal which stem from light reflected multiply back and forth in the fiber between its two ends. The modulation frequency $\frac{1}{2}T$ is most advantageous in requiring the smallest phase excursion (modulation index) in the modulator in order to obtain the maximum possible output signal after the phase sensitive detection.

The phase excursion which is optimum in this sense is in the range of 1 to 3 rodians.

This invention relates further to a device for measuring rotations, i.e. for carrying out the methods of rotation measurements.

The basic device according to the present invention is advantageous because of its reciprocity, ensuring that any changes in the properties of the beamsplitter or of the polarization properties of the fiber do not affect the phase shift of the interferometer. Therefore, the result of the rotation measurement is not influenced by such changes. The reciprocity is obtained by (i) employing for the measurement only that part of the recombined light beams from the fiber ends which travels back towards the light source, and by (ii) inserting a combination of monomode fiber and polarizer between the beamsplitting/combining element and the common optical input/output part of the interferometer. Arrangement (i) guarantees that the two light beams propagating in opposite directions along the fiber travel exactly the same paths inside the beamsplitting/combining element and, therefore, experience exactly the same phase changes. Any change, possibly asymmetric, in the beamsplitting/combining element affects one of the two light beams on its way going out from that element, the other beam on its way returning to that element. If the rotation rate would be evaluated from the light emerging from the fourth part of that element, the two light beams could experience different total phase changes in the splitting and recombining processes. The mentioned combination (ii) acts as a mode filter, passing only a simple transverse mode of a single polarization. It guarantees identical transverse field distributions of the light beams entering and leaving the common optical input/output part of the interferometer. It is well known that such an identity is required for perfect reciprocity.

Further features and advantages of the invention will become apparent from the following description of a particular embodiment and from the drawing.

Figure 1:
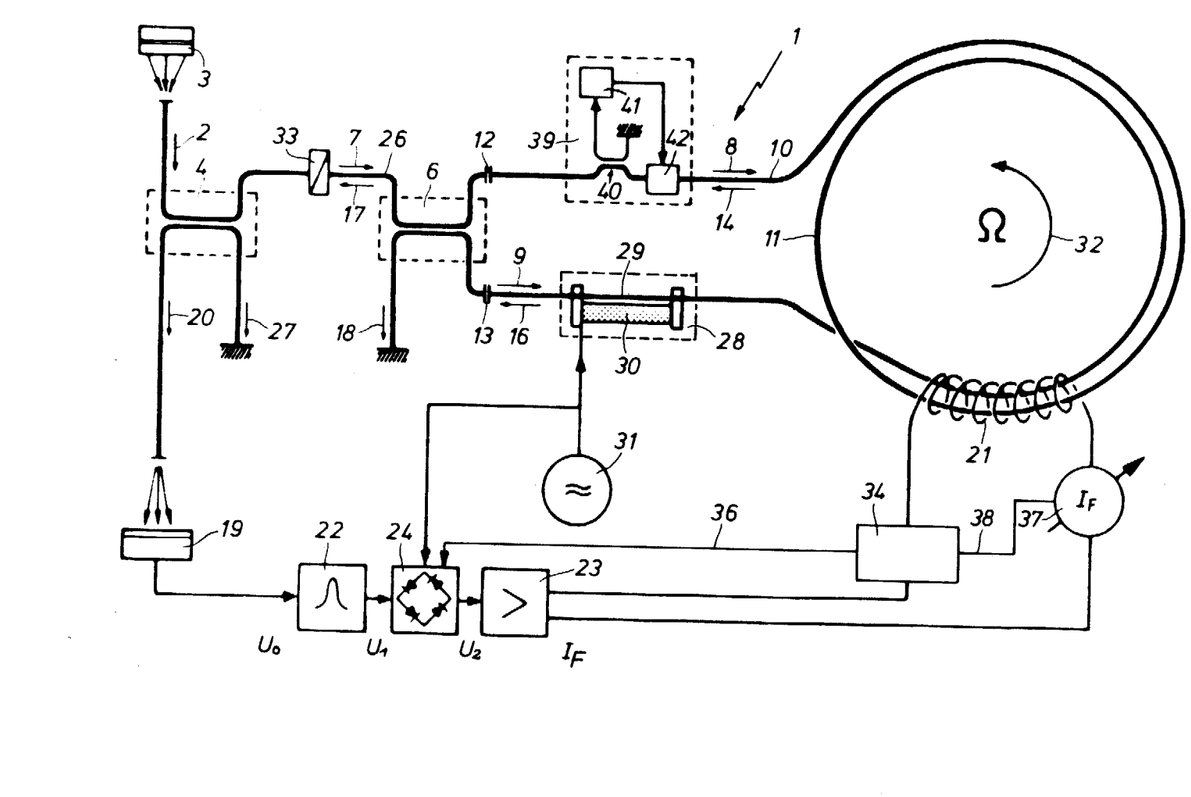
The drawing depicts schematically an arrangement according to the invention for the measurement of rotation rates, containing a fiber-optical Sagnac interferometer and those additional features which are required to realize the method according to the invention.

As shown in the drawing, the Sagnac interferometer 1 is provided with a light source 3. It emits a monochromatic primary light flux represented by the arrow 2. This light source could typically be a laser. Further, there is provided an auxiliary beamsplitter 4 and the main beamsplitting/combining element 6. The auxiliary beamsplitter branches off a part of the primary light flux 2 and directs it to the main beamsplitter 6. This part, represented by the arrow 7, forms the input light flux of the interferometer. The main beamsplitter 6 splits the input flux 7 in two coherent light beams of approximately equal intensities. They are represented by the arrows 8 and 9. They both travel, in opposite directions, along the main light path of the interferometer. That path begins at the main beamsplitter 6 and also ends there, and it encircles a certain area. The path is defined along the major part of its length by an optical fiber 10, usually a so-called monomode fiber. The fiber is laid out in a number of turns 11 so that the encircled area is as large as possible, yet remaining of relatively small overall size. The fiber and the main beamsplitter are rigidly attached to the body whose rotation is to be measured. Couplers 12 and 13 are provided which couple the split beams 8 and 9 from the main beamsplitter 6 into the optical fiber, and also couple the two beams 14 and 16, returning from the fiber, back to the main beamsplitter. These couplers are preferably arranged in the vicinity of the main beamsplitter 6. The latter one recombines the returning beams 14 and 16 and produces two output beams, represented by the arrows 17 and 18. As these output beams are formed by the superposition of the returning beams 14 and 16, their intensities depend on the relative phase difference of the beams 14 and 16, and also on the properties of the main beamsplitter.

The construction and operation of the Sagnac interferometer described thus far are known: when the main light path of the interferometer is rotating at an angular velocity $\Omega$ about an axis normal to the plane of the main light path, a relative phase shift is produced between the two light beams 14 and 16 when they return to the main beamsplitter 6, after originally leaving that beamsplitter as light beams 9 and 8, respectively. The relative phase shift $2\phi$ is proportional to the rotation rate $\Omega$.

$$2\phi = 8\pi F\Omega/\lambda c \qquad (1)$$

Here F denotes the total area encircled by the main light path of the interferometer, and $\lambda$ and c are the wavelength and the velocity of the light in vacuum, respectively.

An accurate evaluation of $\Omega$ from the above relation requires an accurate determination of the phase difference $2\phi$. This quantity can be obtained by either analyzing the spatial intensity distribution of an interference pattern generated from the beams 14 ynd 16 or, preferably, by analyzing the intensities of the output beams 17 and 18 by means of photoelectric detectors and associated electronic circuitry.

In order to facilitate the determination of the phase difference $2\phi$, a phase modulation is applied to the two beams 8 and 9 (or 16 and 14, respectively) which travel in opposite directions along the main light path 6,10,6 of the interferometer. The purpose of this modulation is to generate an electrical signal that varies linearly with $\Omega$ at small values of $|\Omega|$, and also to shift the essential components of the signal at the detector to a frequency range free of flicker noise. The modulation frequency $f_o$ is preferably chosen in the range of ¼T to ½T, where T is the transit time of a light signal along the path 6,10,6.

By the phase modulation, the light flux 20 falling onto the photoelectric detector 19 varies temporally with a function that also contains a frequency component at $f_o$. This light flux 20 is branched off by the auxiliary beamsplitter 4 from the output flux 17 leaving the main beamsplitter 6 in the direction toward the light source. The output voltage $U_o$ of the photoelectric detector 19 is filtered by an electronic bandpass filter 22, tuned to $f_o$, and is passed on, as a voltage $U_1$, to the synchronous rectifier 24 whose reference input is connected to the generator 31 providing the phase modulation. At small rotation rates $|\Omega|$, and assuming for the moment that the Faraday solenois 21 is not activated the output voltage $U_2$ of the synchronous rectifier varies linearly with the rotation rate $\Omega$. Therefore, the electronic evaluation of $\Omega$ from the signal $U_2$ is simple, yielding the magnetitude $|\Omega|$ as well as the sign of $\Omega$, i.e. the sense of rotation. Stray light falling on the detector changes only the DC component of $U_o$ and, therefore, does not affect the measurement and evaluation of the rotation rate $\Omega$.

Another feature of the embodiment shown in the drawing is a phase control circuit. Employing the Faraday effect in the optical fiber, this circuit produces a phase difference $2\phi_F$ between the light beams 8 and 9 which is equal in magnitude, but of opposite sign, to the phase difference $2\phi$ caused by the rotation $\Omega$. The error signal driving the control circuit is the output voltage $U_2$ of the synchronous detector. The sign of this voltage is uniquely related to the sign of the total phase difference $(2\phi + 2\phi_F)$. In order to produce the phase shift $2\phi_F$ by the Faraday effect, it is necessary that the two light beams 8 and 9 have circular polarizations of equal senses of rotation, e.g. both beams left circular. The magnetic field required for the Faraday phase shift is produced by a solenoidal coil 21 which is wound around at least a section of the optical fiber. The electric current $I_F$ flowing through this coil is controlled by the control amplifier 23 so as to always minimize the voltage $U_1$ at the output of the filter 22 tuned to the modulation frequency $f_o$. The control amplifier is designed to have sufficiently high gain, so that despite of possible small nonlinearities of the detector and associated amplifier the condition $(2\phi + 2\phi_F) = 0$ is maintained with high precision. Because of the mentioned highly linear relationship between $I_F$ and $2\phi_F$, then, the current $I_F$ is exactly proportional to the rotation rate $\Omega$ to be measured. Hence, the current $I_F$ is measured by an ammeter that can be calibrated to read directly the rotation rate.

In order to utilize fully the high sensitivity and high linearity of the described phase modulation and compensation scheme, it is necessary to reduce as far as possible the influence of temperature changes and unavoidable mechanical perturbations like vibrations. These effects tend to modify the optical properties of the fiber, of the main beamsplitter 6, and of the couplers 12,13.

The reduction of these disturbing influences is achieved by passing the light flux 7 into the main beamsplitter 6 through the combination of polarizer 33 and monomode waveguide 26, and by then evaluating the rotation rate $\Omega$ only from the light flux 17 that returns from the main beamsplitter 6 through this very combination of monomode waveguide 26 and polarizer 33. For this evaluation of the flux 17 only that part 20 is used which is branched off by the auxiliary beamsplitter 4. In comparison to the more obvious possibility of evaluating $\Omega$ from the flux 18, which is available at the fourth port of the main beamsplitter 6 and which would yield a considerably higher power level at the detector, the evaluation of $\Omega$ from the flux 17 is nevertheless advantageous. The reason is the reciprocity of the light path leading from the auxiliary beamsplitter 4 via the main beamsplitter, in either direction through the fiber 11, and back via the main beamsplitter to the auxiliary beamsplitter. Because this light path starts and ends at the same point, strictly single-mode and single-polarization optical port, it is perfectly reciprocal if the interferometer is at rest and the current $I_F$ is zero. This perfect reciprocity is maintained in the presence of all the above mentioned thermal and mechanical perturbations. Therefore, such perturbations may well cause variations of the total light intensity at the detector 19. However, as these variations are very slow compared to the modulation frequency $f_o$, they do not lead to signals $U_1$ or $U_2$. Such signals are produced by the phase modulation of the light beams 9 and 16 only if $(2\phi + 2\phi_F) \neq 0$. Consequently, the described evaluation of $\Omega$ from the light flux 17 guarantees an excellent stability of the zero-point of the rotation measurement and an immunity against the mentioned perturbations.

The required perfect reciprocity of the light path is provided by the combination of polarizer 33 and single-mode waveguide 26, acting as a highly efficient single-mode-plus-single-polarization filter. Its effect is that the light fluxes leaving the auxiliary beamsplitter 4 and returning to it have exactly the same transverse electromagnetic field distributions, i.e. they propagate in the same electromagnetic mode.

Because most practically realized so-called "monomode" waveguides actually permit the propagation of two modes of mutually orthononal polarizations, the polarizer 33 is required with those waveguides to block one of the polarizations. In a preferable embodiment, the polarizer 33 is so inserted between the auxiliary beamsplitter and the main beamsplitter that the monomode waveguide extends from the polarizer to both sides, i.e. to the main beamsplitter as well as to the auxiliary one.

The optimum choice of that state of polarization which is to be passed by the polarizer 33 will be described below in connection with the discussion of the Faraday phase-controlling element 21.

It had already been mentioned that the light flux 18 does not permit an accurate, unperturbed evaluation of the rotation rate $\Omega$. The intensity of the flux 18 does depend on the phase shift $(2\phi + 2\phi_F)$, but it depends also on the properties of the main beamsplitter 6. In order to avoid interferences from vagabonding light beams, this fourth part of the beamsplitter 6 must be terminated reflection-free. Likewise, the fourth port of the auxiliary beamsplitter, at which the light flux 27 emerges, must be terminated reflection-free.

In the following, a description is given of the construction and operation of those components which are necessary to realize the above-mentioned principles of the invention.

The phase modulator may be constructed as indicated in the drawing: A short section, typically 1 cm long, of the fiber 10 is fixed at its ends to a piezoelectric body 30, which is driven by an AC generator 31 so as to perform oscillations along the direction of the fiber. Thus, as the fiber is elastic, the length of the fixed fiber section varies correspondingly, and the phase of a light beam passing through that section is modulated. Alternatively it is possible to wrap the fiber 11 in one or several turns tightly around a tubular body performing oscillations which vary periodically the length of its circumference. In either case, the oscillation frequency must be $f_o$, and the amplitude of the oscillation must be so that the length of the fiber is changing by approximately ±0.2 μm in order to provide the required phase excursion of typically ±1 radian.

For a description of the principle of operation of the phase modulation scheme, two simplifying assumptions are made. The position of the phase modulator 28 is assumed to be close to the coupler 13, so that the modulation acts only at one end of the light path 6, 10, 6. The main beamsplitter 6 is assumed to be lossless and to split the incident power into two equal parts. In such a beamsplitter, a phase shift of 90° must exist between the amplitudes of the two output light fluxes. Consequently, ignoring here all other unimportant phase factors, the complex amplitudes $A_1$ and $A_2$ of the two light beams 8 and 9, respectively, are $$A_2 = iA_1 = A_0/\sqrt{2}, \tag{2}$$

where $A_o$ denotes the amplitude of the light flux 7 when entering the beamsplitter 6, and $i = \mathfrak{c} - 1$ is the imaginary unit.

The phase modulator produces a periodic phase delay $\Psi \sin 2\pi f_o t$, with $\Psi$ characterizing the maximum phase excursion. When the light beam 9 has passed the modulator and enters the main length of fiber, its light amplitude is $A_2 \exp(i\omega t - i\Psi \sin 2\pi f_o t)$. Here, $\omega$ is the angular frequency of the light. The light beam 8, entering the fiber 12, has the complex amplitude $A_2 \exp(i\omega t)$. In the drawing it is assumed that the entire interferometer is rotating in the sense indicated by the arrow 32. The light beam 9 propagates along the coiled fiber in the same direction. Therefore, when this beam emerges again from the fiber as beam 14, it has suffered a phase delay $(\beta L + \Delta)$.

Simultaneously the beam 8, propagating oppositely, has suffered the phase delay $(\beta L - \Delta)$ when it arrives at the other fiber end. In these expressions, $\beta$ denotes the propagation constant of the fiber, L the fiber length, and $$2\Delta = 2\phi + 2\phi_F, \tag{3}$$

is the total phase difference between the two oppositely travelling light beams which results by the Sagnac effect from the rotation of the interferometer and by the Faraday effect from the current $I_F$. In the light beam 14, leaving the fiber at 12, the phase modulation is delayed by the group delay time T of the coiled fiber of length L. The other beam, entering the fiber as 8, is also modulated in the modulator 28 before leaving the fiber at 13. Hence, the amplitudes $B_1$ and $B_2$ of the emerging light beams 14 and 16, respectively, are $$B_1 = (A_0/\sqrt{2}) \exp [i(\omega t - \beta L - \Delta) + i\psi \sin 2\pi f_0(t - T)] \tag{4a}$$

$$B_2 = (-iA_0/\sqrt{2}) \exp [i(\omega t - \beta L + \Delta) + i\psi \sin 2\pi f_0 t]. \tag{4b}$$

These light waves are recombined in the main beamsplitter 6. The beam 17, propagating toward the auxiliary beamsplitter 4, has the amplitude $C_2 = (\beta_1 + i\beta_2)/\sqrt{2}$. Here again the 90° phase difference between the output amplitudes of a lossless beamsplitter has been taken into account.

A detailed evaluation shows that $C_2$ is particularly simple if the modulation frequency is chosen as $$f_0 = \tfrac{1}{2}T \tag{5}$$

For a silica fiber of length L = 1000 m, for example, the relation (5) yields $f_0 \approx 100$ KHz. With $f_o$ chosen according to Equation (5), the power of the recombined light flux 17 is found as $$|C_2|^2 = |A_0|^2 \cos^2(\Delta + \Psi \sin 2 f_0 t). \tag{6}$$

The output signal $V_o$ of the photoelectric detector is proportional to $|C_2|^2$. This signal is amplified and filtered in the tuned amplifier 22. The subsequent synchronous rectifier receives a reference signal at frequency $f_o$ from the generator 31 and, therefore, filters out of $U_o$ only the component at frequency $f_o$. A Fourier analysis of Equation (6) shows this frequency component to be $$U_1 = J_1(2\Psi) \sin 2\Delta \sin 2\pi f_0 t, \tag{7}$$

where $J_1(x)$ denotes the Bessel function of the first kind and order 1. According to this function, the modulation signal $U_1$ is largest if the phase excursion $\Psi$ is chosen in the range of $\tfrac{1}{2}$ to 3/2 radians.

The output signal of the synchronous rectifier is
$U_2 = J_1(2\Psi) \sin 2\Delta$.

This signal is fed into the control amplifier 23 and controls the current $I_F$ through the solenoidal coil 21, which is wound around the optical fiber 10, 11.

By the Faraday effect, the magnetic field of the solenoid 21 produces a nonreciprocal phase difference $2\phi_F$ between the two light beams travelling in opposite directions along the main light path 6, 10, 6 of the interferometer:

$$2\phi_F = 2n_{el} n_{opt} V I_F$$

In this equation, $n_{el}$ and $n_{opt}$ denote the number of turns of the solenoid and of the fiber coil, respectively, and V is Verdet's constant of the fiber material. In a typical example, $n_{opt} = 300$ turns; $n_{el} = 3000$ turns, and $\lambda = 0.85$ μm. With a silica fiber, then, a current $I_F \approx 1A$ is required to produce a phase difference of $$2\phi_F = 2\pi.$$

The control amplifier is preferably designed with a proportional-plus-integral response characteristic. It controls the current $I_F$ through the solenoid so that the signals $U_1$ and $U_2$ are maintained nearly equal to zero. According to the relation (2), then, $$2\phi = -2\phi_F. \tag{9}$$

This relation is maintained with an accuracy that is primarily governed by the gain of the control loop. Therefore, this accuracy can be made very high. The validity of Equation (9) is not affected by the actual values of the phase excursion $\Psi$, of the modulation frequency $f_o$, of the optical power $|A_o|^2$ in the input light flux 7, or of the detector sensitivity. As the dependence (8) of the $2\phi_F$ on the solenoid current is strictly linear, the rotation rate $\Omega$ is simply proportional to the current $I_F$, independent of variations of the parameters Ψ, $f_o$ and $|A_o|^2$ just mentioned. Therefore, the determination of Ω from $I_F$ is highly accurate and linear. The described use of the Faraday effect as a highly linear, nonreciprocal phase shifter requires that the light beams in the fiber 10, 11 have uniform circular polarization, at least inside the solenoid 21. Thus, for example, the polarization must be left-circular in all fiber turns inside the solenoid and in both directions of light propagation along the fiber. Alternatively, the polarization may be chosen as uniform right-circular. The uniformity is necessary because it is characteristic for the Faraday effect to produce the phase difference $2\phi_F$ between two beams of equal circular polarization and opposite directions of propagation. Better known is the equivalent characteristic of the Faraday effect to produce that phase difference $2\phi_F$ between two beams of opposite circular polarization and equal directions of propagation. In order to arrange for the required uniform circular polarization of the beams 8 and 9, several measures must be taken. Firstly, the polarizer 33 positioned in the course of the monomode waveguide 26 must be chosen and adjusted so that at least the light beam 9 arrives with the specified circular polarization at the solenoid 21. This condition can be satisfied in general only with an elliptical polarizer 33, because the main beamsplitter 6 and the phase modulator 28 may be birefringent. The elliptical polarizer is realized preferably by the combination of a linear polarizer and an element of adjustable birefringence such as Soleil-Babinet compensator. Secondly, the specified circular polarization of the beam 9 must be maintained along that entire length $L_1$ of the fiber which is inside the solenoid 21. Thirdly, it is necessary to adjust also the polarization of the other beam 8 to the specified circular state at the point where that beam enters the solenoid. Assuming that the second problem of maintaining the circular polarization of beam 9 has been solved, no specific measures are necessary to maintain the circular polarization of beam 8. Rather, by the general properties of birefringent optical systems, the circular polarization of beam 8 is maintained automatically in that case. The initial adjustment of the polarization of the beam 8 to the specified circular state is achieved by providing a polarization control system 39 near that end 12 of the fiber where the beam 8 is coupled in. This control system 39 will be explained later on in detail. For the moment it is assumed that this system keeps the polarization of beam 8 adjusted to the specified circular state.

The above mentioned second problem of maintaining the circular polarization of beam 9 throughout the fiber length $L_1$ is preferably solved by using for this length a fiber of the lowest possible birefringence. However, in addition to the unavoidable residual birefringence of even the best available fibers, an additional component of birefringence is introduced into the fiber when it is bent into the form of the coil 10, 11. The influence of both these disturbing components of birefringence is suppressed by winding the coil 10, 11 with a twisted optical fiber. The twist induces elasto-optically a circular birefringence (stress optical activity) in the fiber. By choosing the twist rate sufficiently high, e.g. 20 revolutions per meter of fiber, this circular birefringence can be made to far outweigh the other disturbing components of birefringence, mentioned above.

The predominance of the circular birefringence, combined with an averaging effect resulting also from the twist, serves to maintain a circular state of polarization along the entire twisted section of the fiber, independent of the direction of light propagation. This principle of maintaining a circular polarization has been discussed in detail in the copending patent application of a fiber-optical current sensor by S. C. Rashleigh and R. Ulrich (German patent application Pat. No. 2835794.0 U.S. application: Ser. No. 06/066.282 filed Aug. 13, 1979). In that application, two collinear beams of opposite circular polarizations are described. In the twisted fiber they both maintain their circular states, so that their superposition results at any point in a nearly perfect linear state.

In the simplest possible arrangement, the fiber 10, 11 is twisted along its entire length. It is preferable in that case to have also the solenoid 21 extend over the entire circumference of the fiber coil, so as to utilize best the magnetic flux of the solenoid and to produce the lowest possible stray magnetic field. It is not necessary that the fiber is twisted in the same sense along the entire length of the fiber. Rather, it is also possible to work with a twist that is alternatingly left-handed and right-handed on successive sections of the fiber. Preferably, equal amounts of left-handed and right-handed twist are impressed on the fiber, so that the total number of revolutions of one fiber end relative to the other one is zero. In that case, the influence of temperative variations on the overall birefringence of the fiber is a minimum.

It is not necessary, though, to expose the entire length of the fiber 10, 11 to the magnetic field of the solenoid. Rather, it is sufficient to arrange only a section of e.g. $L_1 = 100$ m length inside the solenoid. Only this part $L_1$ of the fiber must be of the low-birefringence type and must be twisted to stabilize the circular polarization. The remainder $(L-L_1)$ of the fiber may have arbitrary birefringence and need not be twisted, because the states of polarization in that part of the fiber have no influence on the operation of the rotation measurement. In one example of a practical realization, a section of length $L_1 = 100$ m of the fiber is twisted at a rate of 100 radians/meter and is bent into a fiber coil of 10 cm diameter and approximately 320 turns. The solenoid is wound in a toroidal form by feeding an insulated copper wire of 0.25 mm diameter in 10,000 turns through the fiber coil. In this arrangement, a current of 0.1 A produces a phase difference $2\phi_F\omega 2\pi$. The solenoid consumes approximately 1 Watt of electrical power in that case. Its mass is approximately 150 grams, and its electronic time constant is $L/R\omega 0.2$ msec. By using a larger section $L_1$, lower values of power, mass and time constant can be achieved.

The above described method of measuring rotation rates, employing a compensation of the Sagnac-type phase difference $2\phi$ by a Faraday-type phase difference $2\phi_F$ offers also the possibility of a self-calibration of the electronic part of the measurement system.

According to Equations (7) and (3), the output signal $U_1$ depends periodically on the Faraday-type phase difference $2\phi_F$. The signal $U_1$ does not change if the current $I_F$ in the solenoid is changed abruptly by an amount $\delta I_F$ that increases the pase difference $2\phi_F$ by $2\pi$. After such a change, the phase control loop settles at the new current value $(I_F + \delta I_F)$. This fact permits a direct measurement of $\delta I_F$ as the difference in the $I_F$ values associated with two neighboring stable states of the control loop, both obtained at the same rotation rate Ω. The necessary abrupt jumps of the control loop between these states can be produced in a controlled manner by suitable electronic circuitry 34. As it is known that $\delta I_F$ corresponds exactly to a phase shift $2\pi$ in 2 $\phi_F$, the factor of proportionality between 2 $\phi_F$ and $I_F$ can thus be determined automatically by the electronic system itself. In a preferable embodiment of this self-calibration procedure the absolute value $|I_F|$ of the solenoid current can be kept at a lower level by causing $I_F$ to jump by only $\delta I_F/2$. Such changes of $I_F$ result automatically if the phase of the reference signal is reversed which is fed from the generator 31 to the synchronous rectifier 24. In the drawing, the possibility of such phase reversals is indicated by the control line 36 that leads from the electronic circuit 34 to the synchronous rectifier 24. By initiating these current jumps repeatedly, e.g. once every second, and evaluating from them electronically the mentioned factor of proportionality, any drift of the electronic circuits or of the temperature-dependent Verdet constant can be fully taken into account in the measurement of a rotation rate $\Omega$. Furthermore, by causing such jumps of $I_F$ it is possible to operate the solenoid with low average currents $|I_F|$ even at high rotation rates $\Omega$ which correspond to phase differences $|2 \phi_F| >> 2\pi$, and which would cause an undesirably high power consumption of the solenoid. In a preferable embodiment such a phase jump of $\pi$ or $2\pi$, reducing $I_F$ by $\delta I_F/2$ or by $\delta I_F$, respectively, is initiated as soon as the solenoid current exceeds a certain level, e.g. $0.6\delta I_F$ or $1.2\delta I_F$, respectively. A corresponding jump of opposite sign must occur when $I_F$ is negative and exceeds $-0.6\delta I_F$ or $-1.2\delta I_F$, respectively. Before evaluating $\Omega$ from 2 $\phi_F$, then, 2 $\phi_F$ must be increased by a suitable multiple of $\pi$ or $2\pi$, respectively, which is calculated electronically as the sum of all past phase jumps, with their signs properly taken into account. In the drawing this mode of operation is indicated by the presence of a control line 38, linking the instrument 37, which measures the current $I_F$, with the electronic control circuitry 34. These are several advantages of this mode of operation: The total measuring range is extended to a multiple of $\delta I_F$, whereas the full-scale range of the instrument 37 measuring $I_F$ can be limited to $|I| \leq \delta I_F$.

Thus, a better resolution of small changes in the measured rotation rate results. Moreover, the average power dissipated in the solenoid is reduced, with a concurrent reduction of thermal perturbations of the fiber and possibly a reduction in the weight of the electronic control amplifier 23.

It had been mentioned that the purpose of the monomode-waveguide 26 is to improve the stability of the zero-point of the rotation measurement. In the simplest embodiment this waveguide is realized by an approximately one meter long section of monomode optical fiber, of the same type as is used in the fiber coil 10,11, in combinaton with a Glan-Thompson linear polarizer 33. Simultaneously, the two beamsplitters 4 and 6 have the form of semitransparent mirrors, and the various light-beams are coupled into and out of the various fibers by positive lenses. In a preferable embodiment, based on the technology of integrated optics, the monomode waveguide 26 is realized as a narrow stripe waveguide. On one of its surfaces, a metallization acts as the polarizer 33, and stripe directional couplers serve as the beamsplitters. The phase modulator 28 can also be integrated in the form of a short section of electrooptic waveguide with suitably attached electrodes.

The monomode waveguide/polarizer combination reduces the influence of variations of the optical alignment of the interferometer and beamsplitter on the result of the rotation measurement, because a single, fully reciprocal port of the interferometer is thus provided. For the attainment of this reciprocity the type of the polarizer 33 (linear, elliptical, or circular) and its azimuthal adjustment are immaterial. However, for proper operation of the Faraday compensation scheme it is necessary that the type and adjustment of the polarizer 33 are chosen so that the two light beams 8 and 9 have the same, as nearly as possible circular, state of polarization in the region of the solenoid 21. The actual state of polarization of these beams 8 and 9 does not only depend on the type and adjustment of the polarizer, but also on the birefringence of the main beamsplitter 6, of the phase modulator 28, and possibly also of the waveguide 26 and the couplers 12,13. The combined birefringences of these components must be trimmed, e.g. by a Soleil-Babinet compensator or by stress birefringence induced in one of those components, until at last beam 9 enters the solenoid with the specified circular polarization. The polarizer 33 can be placed alternatively at a number of positions between the auxiliary beamsplitter 4 and the main beamsplitter 6. It can be placed before, behind, or within the monomode waveguide 26. Alternatively the single polarizer 33 can also be replaced by two separate polarizers, one of which is placed between the source 3 and the auxiliary beamsplitter 4, and the other one between the auxiliary beamsplitter 4 and the detector 19. In this case, of course, the types and adjustments of the two polarizers must be chosen so that they again correspont to the circular polarization of beam 9.

The presence of the polarizer 33 creates two conditions which must be satisfied for a reliable and stable operation of the rotation measuring system 1. The first condition is that the light originating from the source 3 is either unpolarized, or that it has a polarization permitting as much power as possible to pass as light flux 7 through the polarizer 33. The other condition is that the light flux 17, returning through the monomode waveguide 26 from the main beamsplitter 6, is also passing as completely as possible through the polarizer 33. The latter condition requires that the light beams 14 and 16 have suitable states of polarization when they leave the fiber at the couplers 12 and 13. Starting from equal circular polarizations of the beams 8 and 9 when they enter into the solenoid, and invoking the theorem of reciprocity, it can be shown that the required polarizations of the output beams 14 and 16 are identical with those which (propagating in the reversed directions) must be coupled into the fiber at 12 and 13 in order to obtain the mentioned circular polarizations of beams 8 and 9 at the solenoid. For one of the two input beams, for example for the beam 9 entering the fiber at coupler 13, it is possible to adjust the required circular state of polarization by choosing the type and azimuth of the polarizer 33, as mentioned earlier. This adjustment, however, determines also the state of polarization of the other input beam 8 at the coupler 12. The latter state is generally different from that state which would yield the required circular polarization of beam 8 at the solenoid. Therefore, a polarization controlling element is provided in the light path close to the coupler 12. This element is characterized by an adjustable birefringence and can be tuned so that beam 8, too, arrives at the solenoid with the required circular polarization. Under stable ambient conditions, in particular when the temperature is stable, it is possible to tune this polarization controlling element once and for all. In a practical situation, however, when the ambient temperature and other parameters vary which affect the birefringence of the fiber, an automatic polarization control system is preferable.

Such a control system is provided in the arrangement 1 as a part of the present invention. In the drawing, the box 39 represents this control system. It comprises a beamsplitter of directional coupler 40 which branches off a small fraction of the power of beam 14 travelling toward the main beamsplitter 6. This fraction is analyzed for its state of polarization in the polarimeter 41. A reference state of polarization is defined by the condition that light having this state at the coupler 40 yields a light flux 17 that passes with maximum transmission through the polarizer 33. In the polarimeter 41, the polarization of the fraction branched off in the coupler 40 is compared with the reference state. If a difference is detected, error signals are generated which act in an element 42 of variable birefringence on the polarization of the light passing through the coupler 40 in such a way that the error signals eventually vanish. Hence, this control system 39 keeps the output polarization of beam 14 at the coupler 12 adjusted to its optimum state. From the reciprocity argument given earlier it follows that this optimum adjustment of the output beam 14 is identical with the adjustment for optimum polarization of the input beam 8, i.e. for the specified circular polarization at the solenoid. Thus, the polarization control system accomplishes two tasks simultaneously: Under conditions of variable birefringence of the fiber, the system maintains the polarizations of the input beam 8 in a circular state, equal to that of the other input beam 9, at the solenoid, thus permitting optimum operation of the Faraday phase shifter. At the same time, the system maintains the polarization of the output beam 14 at its optimum state, equal to that of the other output beam 16, at the position of polarizer 33, so that the two output beams can always interfere with maximum contrast and yield maximum signal/noise ratio at the detector.

In a simple embodiment, the polarization controlling element 42 is realized by a pair of electromagnets, squeezing the fiber in two azimuthal directions differing by 45°. The stress-induced birefringence in the fiber material is sufficient to control the polarization. A version of the directional coupler 40 that is most suitable in the control system has recently been described by S. K. Sheem and T. G. Giallorenzi in Optics Letters 4 January 1979, p. 29.

As an alternative to the arrangement shown in the drawing the coupler 40 may also be arranged outside the fiber, between the fiber end 12 and the main beamsplitter 6. In that case, a simple, semitransparent mirror may serve as the coupler 40.

Similarly, the polarization controlling element 42 may be realized outside the fiber in the form of two electro-optically controllable retardation plates, their fast axes including an angle of 45°. The details of the polarization control system are described in the copending patent application Ser. No. 111,852 of M. Johnson and R. Ulrich, filed on even date. The disclosure of said patent application (which corresponds to german patent application Pat. No. 29 01 388.5, filed Jan. 15, 1979) is herewith fully incorporated into the present patent specification.

Above, the polarization control system had been described as adjusting the polarization by the element 42 until the polarization in the branched off part equals a certain reference state. Alternatively, it is possible to have the control system vary the birefringence of element 42 until the light flux 18, emerging from the fourth port of the main beamsplitter, has minimum power.

Finally, another advantageous modification of the above described invention is mentioned: As an alternative to the discrete phase modulator, the phase modulation of the light beams 8 and 9 (or 16 and 14, respectively), travelling in opposite directions along the fiber, can be accomplished in a simpler fashion by superimposing on the solenoid current $I_F$ an alternating current of the modulation frequency $f_o$. The amplitude of that AC current should be approximately $\delta I_F/6$ in order to obtain a phase excursion $\Psi$ of approximately 1 radian. The advantage of this modulation is that no separate phase modulator is required.

What I claim is:

1. A method for the measurement of rotation rates by the Sagnac effect in a light path which encircles an area, said light path being defined along at least a portion thereof by an optical fiber which is capable of being rotated, said method employing two coherent light beams which are coupled with fixed states of polarization respectively into opposite ends of said fiber and which are recombined after having traversed the fiber in opposite directions, said rotation rate $\Omega$ being evaluated from the intensity of one of the output light fluxes which results after recombination of said two coherent light beams, and wherein said intensity varies as a function of the phase shift which results between said two coherent beams if the fiber defined along said light path is rotated, said method including the steps of:

phase modulating said two coherent light beams by a phase modulation signal having an amplitude of $\Psi \sin 2\pi f_o t$, where $\Psi$ is the maximum phase excursion and $f_o$ is the modulation frequency;

detecting the intensity of said output light flux to produce a detector output signal;

passing said detector output signal through a synchronous rectifier with reference frequency $f_o$; and controlling a current through a solenoid which is wound around said fiber along at least a part of its length, said control being accomplished by an automatic control loop which uses as its error signal the filtered output signal of said synchronous retifier and which maintains the condition $$2\Delta = 2\pi n$$

where n is an integer and $2\Delta$ denotes the phase difference which said two coherent light beams have when they emerge from said light path, said phase difference $2\Delta$ being the algebraic sum $2\phi + 2\phi_F$ of a first phase shift $2\phi$ which results from the rotation of said light path and of a second phase shift $2\phi_F$ which results from the Faraday effect which is caused by the magnetic field of said solenoid is said part of the fiber, said method further comprising the steps of:

a. storing the momentary value of said current in a first state of vanishing error signal;

b. changing said current by a fixed amount in a timer interval that is shorter than the response time of said control loop, said amount being chosen so that the resulting change of said phase difference $2\Delta$ equals approximately $2\pi$;

c. allowing said control loop to settle in a second state of vanishing error signal, said current assuming a second value which corresponds to a change of exactly $2\pi$ in said phase difference;

d. comparing said second current value with said stored first value, the difference between said two current values representing a current which corresponds to a phase change of $2\pi$, said current difference being used as a scale factor in the evaluation of said phase shift $2\phi$ from said second current value; and e. repeatedly performing steps a. through d. to provide a continuous updating of said scale factor.

2. A method for the measurement of rotation rates by the Sagnac effect in a light path which encircles an area, said light path being defined along at least a portion thereof by an optical fiber which is capable of being rotated, said method employing two coherent light beams which are coupled with fixed states of polarization respectively into opposite ends of said fiber and which are recombined after having traversed the fiber in opposite directions, said rotation rate $\Omega$ being evaluated from the intensity of one of the output light fluxes which results after recombination of said two coherent light beams, and wherein said intensity varies as a function of the phase shift which results between said two coherent beams if the fiber defined along said light path is rotated, said method including the steps of:

phase modulating said two coherent light beams by a phase modulation signal having an amplitude of $\Psi \sin 2\pi f_o t$, where $\Psi$ is the maximum phase excursion and $f_o$ is the modulation frequency;

detecting the intensity of said output light flux to produce a detector output signal;

passing said detector output signal through a synchronous rectifier with reference frequency $f_o$; and controlling a current through a solenoid which is wound around said fiber along at least a part of its length, said control being accomplished by an automatic control loop which uses as its error signal the filtered output signal of said synchronous retifier and which maintains the condition $$2\Delta = 2\pi n$$

where n is an integer and $2\Delta$ denotes the phase difference which said two coherent light beams have when they emerge from said light path, said phase difference $2\Delta$ being the algebraic sum $2\phi + 2\phi_F$ of a first phase shift $2\phi$ which results from the rotation of said light path and of a second phase shift $2\phi_F$ which results from the Faraday effect which is caused by the magnetic field of said solenoid is said part of the fiber, said method further comprising the steps of:

a. storing the momentary value of said current in a first state of vanishing error signal;

b. changing said current by a fixed amount in a time interval that is shorter than the response time of said control loop, said amount being chosen so that the resulting change of said phase difference $2\Delta$ corresponds approximately to $\pi$, and simultaneously the phase of the reference signal of said synchronous rectifier is changed by $\pi$;

c. allowing said control loop to settle in a second state of vanishing error signal, said current assuming a second value which corresponds to a change of exactly $2\pi$ in said phase difference;

d. comparing said second current value with said stored first value, the difference between said two current values representing a current which corresponds to a phase change of $2\pi$, said current difference being used as a scale factor in the evaluation of said phase shift $2\phi$ from said second current value; and e. repeatedly performing steps a. through d. to provide a continuous updating of said scale factor.

3. A method according to claim 1 or claim 2, wherein the phase modulation is produced by a modulation of said current flowing through said solenoid.

4. A method according to claim 1 or claim 2, wherein the phase modulation is produced in said fiber near one of its ends by periodically changing the length of a short section of said fiber.

5. A method according to claim 1 or claim 2, wherein said frequency $f_o$ of the phase modulation is chosen between $\frac{1}{4}T$ and $\frac{1}{2}T$, where "T" denotes the transit time of a light signal through said light path.

6. A method according to claim 5, in which said modulation frequency is $F_o = \frac{1}{2}T$.

7. A method according to claim 1 or claim 2, wherein said maximum phase excursion $\phi$ is chosen in the range 1–3 radians.

8. An apparatus for the measurement of rotations by the Sagnac effect in a light path which encircles an area and which is rotating at a rate to be measured, comprising:

a beamsplitter including means for splitting an input light flux into two coherent light beams and respectively coupling said beams into both ends of said light path to traverse said light path in opposite directions, to thereby produce a phase difference of $2\Delta$ between said beams and which further includes means for recombining said light beams after they have traversed said light path to form first and second output light fluxes, and means for directing said first output light flux back towards the source of said input light flux;

a photoelectric detector coupled to receive said first output flux to measure the intensity thereof;

a phase modulator which modulates the phase of said two coherent light beams;

a phase-sensitive rectifier coupled to receive an output signal of said detector for producing an electrical error signal whose magnitude and sign are proportional to $\sin(2\Delta)$;

an automatic control loop coupled to receive said error signal from said rectifier, said loop maintaining with high accuracy said phase difference $2\Delta$ equal to an integer multiple of $2\pi$; and a combination of a monomode waveguide and a polarizer provided between said beamsplitter and a branching device which separates said first output light flux going to said detector from the path of the input light flux, said combination being traversed in opposite directions by said input light flux and by said first output light flux which is used for the detection.

9. An apparatus according to claim 8, wherein said light path is defined by an optical fiber along at least a portion of its length.

10. An apparatus according to claim 9, in which said monomode waveguide is a monomode optical fiber.

11. An apparatus according to claim 9, wherein said control loop includes a phase controlling element comprising a solenoid which is wound around said fiber along at least a part of its length, the current in said solenoid being controlled by said electrical error signal produced in said phase-sensitive rectifier, so that the states of polarization of said two coherent light beams are adjusted to be circular with equal senses of rotation along said part of the fiber length.

12. An apparatus according to claim 11, wherein said solenoid is wound around said fiber along its entire length.

13. An apparatus according to claim 11, which further comprises a system for the automatic stabilization of the state of polarization of one of said two coherent light beams before it returns to said beamsplitter, the reference state of said stabilization system being that state which passes with maximum transmission through said polarizer to said detector.

14. An apparatus according to claim 11, wherein said part of the fiber length which is exposed to the magnetic field of the solenoid has the form of a fiber coil whose turns are surrounded by the turns of said solenoid along a major part of the circumference of said fiber coil.

15. An apparatus according to claim 11, wherein said fiber is twisted along at least said part of its length which is inside the solenoid, the amount of said twist being sufficiently large to maintain the circular states of polarization of said two coherent light beams.

16. An apparatus according to claim 9, wherein said phase modulation is produced in said fiber along a short section situated close to one end of said fiber.

17. An apparatus according to claim 16, wherein the phase modulator comprises a piezoelectric body in which mechanical oscillations are excited by the application of an alternating electric field, said short section of said fiber being attached to said oscillating body so that said short section itself periodically changes its shape.

18. An apparatus according to claim 16, wherein the phase modulator comprises a magnetic body in which mechanical oscillations are excited by the application of an alternating magnetic field, said short section of said fiber being attached to said oscillating body so that said short section itself periodically changes its shape.

19. An apparatus according to claim 16, wherein said short fiber section in which said phase modulation is produced is wound around a cylindrical body in which radial oscillations can be excited at the modulation frequency.

20. An apparatus according to claim 9, wherein said apparatus is formed by integrated-optical elements and wherein said phase modulator comprises an electro-optic modulator.

* * * * *